(12) United States Patent
Conrad

(10) Patent No.: US 6,517,731 B2
(45) Date of Patent: Feb. 11, 2003

(54) OZONATION PROCESS

(75) Inventor: Wayne Ernest Conrad, Hampton (CA)

(73) Assignee: Fantom Technologies Inc., Welland (CA)

( * ) Notice: Subject to any disclaimer, the term of this patent is extended or adjusted under 35 U.S.C. 154(b) by 128 days.

(21) Appl. No.: 09/758,256

(22) Filed: Jan. 12, 2001

(65) Prior Publication Data

US 2002/0040875 A1 Apr. 11, 2002

Related U.S. Application Data

(63) Continuation-in-part of application No. 09/594,715, filed on Jun. 16, 2000, now Pat. No. 6,274,053.

(51) Int. Cl.⁷ .................................................. C02F 1/78
(52) U.S. Cl. .................. 210/760; 210/198; 422/186.12; 422/186.14; 422/186.2
(58) Field of Search ................................. 210/760, 192; 422/186.07, 186.12, 186.14, 186.2

(56) References Cited

U.S. PATENT DOCUMENTS

| | | | |
|---|---|---|---|
| 3,692,180 A | 9/1972 | LaRaus | 210/139 |
| 3,739,440 A | 6/1973 | Lund et al. | 29/25.13 |
| 4,298,467 A | 11/1981 | Gartner et al. | 210/96.1 |
| 4,412,924 A | 11/1983 | Feather | 210/744 |
| 4,504,446 A | 3/1985 | Kunicki et al. | 422/186.19 |
| 4,599,166 A | 7/1986 | Gesslauer | 210/96.1 |
| 4,654,199 A | 3/1987 | Gloor et al. | 422/186.19 |
| 4,656,010 A | 4/1987 | Leitzke et al. | 422/186.18 |
| 4,693,870 A | 9/1987 | Gloor et al. | 422/186.19 |
| 4,859,429 A | 8/1989 | Nisenson | 422/186.13 |
| 4,908,189 A | 3/1990 | Staubach | 422/186.19 |
| 4,959,142 A | 9/1990 | Dempo | 210/167 |
| 5,008,087 A | 4/1991 | Batchelor | 422/186.22 |
| 5,075,016 A | 12/1991 | Barnes | 210/760 |
| 5,102,629 A | 4/1992 | Hayashi et al. | 422/186.18 |
| 5,169,606 A | 12/1992 | Batchelor | 422/186.19 |
| 5,207,993 A | 5/1993 | Burris | 422/256 |
| 5,250,177 A | 10/1993 | Cho | 210/192 |
| 5,306,471 A | 4/1994 | Harbert et al. | 422/186.19 |
| 5,348,709 A | 9/1994 | Wheatley | 422/186.18 |
| 5,354,541 A | 10/1994 | Sali et al. | 422/186.07 |
| 5,458,856 A | 10/1995 | Marie et al. | 422/186 |
| 5,498,347 A | 3/1996 | Richard | 210/739 |
| 5,516,493 A | 5/1996 | Bell et al. | |
| 5,582,717 A | 12/1996 | Di Santo | 210/86 |

(List continued on next page.)

FOREIGN PATENT DOCUMENTS

| | | | | |
|---|---|---|---|---|
| CA | 1251419 | 3/1989 | | 204/176 |
| CA | 2043438 | 12/1991 | | C01B/13/11 |
| CA | 2081014 | 8/1992 | | C01B/13/11 |
| CA | 2112253 | 1/1993 | | C01B/13/11 |
| CA | 2129848 | 8/1993 | | C01B/13/11 |
| CA | 2105590 | 2/1994 | | C01B/13/11 |
| CA | 2171297 | 3/1995 | | C01B/13/11 |
| CA | 1336706 | 8/1995 | | 204/176 |
| CA | 2204353 | 5/1996 | | C01B/13/11 |
| CA | 2214457 | 10/1996 | | C01B/13/11 |
| CA | 2075789 | 12/1998 | | C01B/13/11 |
| EP | 0 462 752 A1 | 4/1991 | | C01B/13/11 |
| GB | 2257429 A | 11/1991 | | C02F/1/28 |
| JP | 1299694 | 12/1989 | | 210/241 |
| JP | 165404 | 6/1995 | | C01B/13/11 |
| WO | WO 00/27760 | 5/2000 | | |

*Primary Examiner*—Betsey Morrison Hoey
(74) *Attorney, Agent, or Firm*—Philip C. Mendes da Costa; Bereskin & Parr

(57) ABSTRACT

A method for treating a liquid (e.g. water) with a gas (e.g. air) containing ozone includes passing air through an corona discharge ozone generator to produce air containing ozone and introducing the air containing ozone into the liquid; and, periodically de-energizing the ozone generator and passing air through the ozone generator.

18 Claims, 2 Drawing Sheets

U.S. PATENT DOCUMENTS

| | | | |
|---|---|---|---|
| 5,630,990 A | 5/1997 | Conrad et al. | 422/186.07 |
| 5,670,094 A | 9/1997 | Sasaki et al. | 261/27 |
| 5,683,576 A | 11/1997 | Olsen | 210/138 |
| 5,709,799 A | 1/1998 | Engelhard | 210/748 |
| 5,711,887 A | 1/1998 | Gastman et al. | 210/748 |
| 5,741,416 A | 4/1998 | Tempest, Jr. | 210/90 |
| 5,765,403 A | 6/1998 | Lincoln et al. | 68/13 R |
| 5,766,447 A | 6/1998 | Creijghton | 205/742 |
| 5,766,488 A | 6/1998 | Uban et al. | 210/739 |
| 5,785,866 A | 7/1998 | Gehringer et al. | 210/748 |
| 5,855,856 A * | 1/1999 | Karlson | |
| 5,879,641 A | 3/1999 | Conrad et al. | 422/186.07 |
| 5,888,403 A | 3/1999 | Hayashi | 210/695 |
| 5,900,143 A | 5/1999 | Dalton et al. | 210/192 |
| 6,068,778 A | 5/2000 | Steiner et al. | 210/760 |
| 6,074,564 A | 6/2000 | Foellmi | 210/760 |
| 6,190,622 B1 | 2/2001 | Conrad et al. | 422/186.07 |

* cited by examiner

OZONATION PROCESS

This application is a continuation in part of U.S. application Ser. No. 09/594,715 filed on Jun. 16, 2000, now U.S. Pat. No. 6,274,053 issued Aug. 14, 2001.

FIELD OF THE INVENTION

This invention relates of a method and apparatus for treating any material such as water with a gas containing ozone. The apparatus may be used in the production of water suitable for human consumption from water contaminated by one or more of microorganisms, chemicals, heavy metals and minerals.

BACKGROUND OF THE INVENTION

Generally, drinking water is produced by municipalities from a lake or ground water by treating the water with ozone or chlorine. Once the water is treated, it is transported to households by pipes. Over time, contaminants may infiltrate into the pipeline. Accordingly, even though the potable drinking water is fed into the pipeline from a water treatment facility, the water may be contaminated by the time it enters a residence. Further, if there is a breakdown in equipment at the water treatment facility or a flood, contaminated water may enter the pipeline.

A variety of domestic filtration systems have been developed for use by consumers to filter water that is delivered by a tap. Such systems may use a filter made from a combination of a porous media filter and activated carbon through which water is passed. This type of system will reduce the levels of chlorine, lead, and pesticides. However, there are several disadvantages associated with this device. In particular, a filtration system will not remove microbiological contaminants from water.

Another popular system in use for the purification of contaminated water is a system which employs ultraviolet light for disinfection in series with a porous media and carbon filter. This type of system will reduce the levels of chlorine, lead, and pesticides and has some disinfection capability. One disadvantage with this system is that the ultraviolet light's disinfection efficacy is greatly diminished by turbidity or colour in the water which can cause the filter to become contaminated by microorganisms which can readily live and breed therein thereby multiplying the danger from any microorganisms which may be present. Thus, the filter of this system also suffers from the disadvantages associated with filters of filtration based systems.

Water treatment apparatus using oxidizing gases have been developed. Some of these devices operate on a batch basis. According to this process, the water is placed in a treatment container and the treatment agent (e.g. a gas), is dispersed through the water, such as via a sparger. Following the completion of the cycle, the water may then be used. One disadvantage with small scale ozone treatment systems such as for domestic applications is to produce an effective amount of ozone to kill a variety of different microbiological agents that may be present in the water.

One method that has been used to generate ozone is corona discharge. Producing corona discharge in a gap through which an oxygen bearing gas is passed can be used to produce ozone. One disadvantage of this approach is that the thermodynamics limit the efficiency of the corona discharge method to produce ozone. The corona discharge results in the production of heat. Increases in the temperature of the ozone containing gas causes exponential increases in the rate of decomposition of ozone to oxygen. Therefore, if the heat is not dissipated, then the quantity and concentration of ozone produced and the thermodynamic efficiency of the ozone generator decreases.

Traditionally, the heat dissipation problem has been addressed by adding complex mechanical structures (e.g. heat sinks that may be air or water cooled, refrigeration) to reduce the steady state operating temperature of an ozone generator to improve ozone production. Disadvantage of this approach are cost and reliability of the ozone generator. The mechanical structure to dissipate heat adds complexity to the design of an ozone generator and increases the cost of the generator and the likelihood that the generator may fail in use. A further disadvantage is that the effectiveness of the cooling of the unit is limited by the rate of conduction and/or convection which is inherent in the design of the ozone generator. For example, if the cooling is applied to the outer housing of the ozone generator, then the limit of the effectiveness of the cooling is predicated upon the rate at which heat is transmitted from its point of production, the corona discharge gap, to the point of extraction (e.g. the outer housing). Further, some elements of an ozone generator are more problematic to cool, such as the high voltage electrode, due to the requirement that it be electrically insulated from the ground electrode and the user.

BRIEF SUMMARY OF THE INVENTION

One method for cooling an ozone generator comprises passing a gas containing oxygen (eg. air) through a corona discharge field. The passage of the gas through the field causes oxygen molecules to recombine to produce ozone upon exposure to the corona discharge. Periodically, the corona discharge is de-energized. The period during which the ozone generator is de-energized may be constant or may be of variable length. During the de-energized periods, the air flow continues and the air flow is then used to directly cool the internal components of the ozone generator. This permits relatively rapid cooling of the ozone generator, without the added complexity of adding a heat exchanger. At the end of the period, the corona discharge is re-energized and ozone is again produced. The duty cycle (i.e. the time period during which the ozone generator is energized to produce a corona discharge) may only be reduced by, say 10 or 15%. However, as the rate of ozone decomposition to air is exponential, a corona discharge ozone generator operated in such a manner produces more grams and a higher concentration of ozone over a water treatment cycle than if the ozone generator were operated continuously for the entire water treatment cycle.

Therefore, in accordance with the instant invention, there is provided a method for treating a liquid with a gas containing ozone comprising the steps of passing the gas through an corona discharge ozone generator to produce gas containing ozone and introducing the gas containing ozone into the liquid; and, periodically de-energizing the ozone generator and passing gas through the ozone generator.

In accordance with another embodiment of the instant invention, there is also provided a method for cooling a corona discharge ozone generator comprises passing a gas containing ozone through the corona discharge ozone generator and energizing the ozone generator to produce gas containing ozone; and, periodically de-energizing the ozone generator and passing gas through the ozone generator whereby the ozone generator is cooled.

In one embodiment, the gas which passes through the ozone generator when it is de-energized is introduced into the liquid.

In another embodiment, the flow rate of gas through the ozone generator is varied when the ozone generator is de-energized.

In another embodiment, the flow rate of gas through the ozone generator is decreased when the ozone generator is energized.

In another embodiment, the flow rate of gas through the ozone generator when the ozone generator is energized is about 50 to 85% lower than when the ozone generator is de-energized.

In another embodiment, the method further comprises providing a substantially constant current to the ozone generator.

In another embodiment, the ozone generator is energized for 50 to 95% of period of time during which the liquid is being treated.

In another embodiment, at least two ozone generators are provided and the method further comprises selectively energizing one or more ozone generator and flowing the gas to the ozone generators whereby, periodically, at least one ozone generator is de-energized and is cooled by the gas flow. Preferably, a higher proportion of the gas is directed to the one or more ozone generator which is de-energized.

In another embodiment, the liquid is water and the method further comprises introducing the water to be treated into a treatment vessel prior to introducing the gas into the liquid whereby potable water is produced by contacting the water with the gas.

In another embodiment, the method further comprises providing first and second gas flow sources wherein the first gas flow source has a lower flow rate than the second gas flow source and directing the first gas flow source to the one or more ozone generator which is energized.

In another embodiment, the method further comprises providing a single gas flow source at a first flow rate and reducing the flow rate of gas from the single gas flow source to the one or more ozone generator which is energized.

BRIEF DESCRIPTION OF THE DRAWINGS

A further, detailed description of the invention, briefly described above, will follow by reference to the following drawings of a preferred embodiment of the invention in which.

DETAILED DESCRIPTION OF THE PREFERRED EMBODIMENT

The method and apparatus of the instant invention may be used to treat any material with ozone. The following description is based on the use of the method and apparatus to treat water to obtain potable water. It is to be appreciated that the water to be treated may already have been treated such as by a municipal water treatment facility to provide drinking water to a community. However, as in some cases the water delivered to a residence may become contaminated in the distribution system, or may not be sufficiently treated by the municipal water treatment facility, a water treatment apparatus which utilizes this method may be used by an individual to treat the water which is delivered to their residence. The water treatment apparatus may also used to treat well water, lake water as well as other source of water which may be used by people to obtain potable water. The water treatment apparatus may be sized to treat small batches of drinking water (eg. 1–3 liters), or to treat all the water delivered to a sink in a house (eg. a point of use water treatment unit producing, e.g., 150 liters/day) or all of the water which s delivered to a house prior to the water entering the piping system in the house (a point of entry water treatment unit producing, e.g., 1500 liters/day). However, the method may be used in larger operations, such as municipal water treatment plants.

Figure 1:
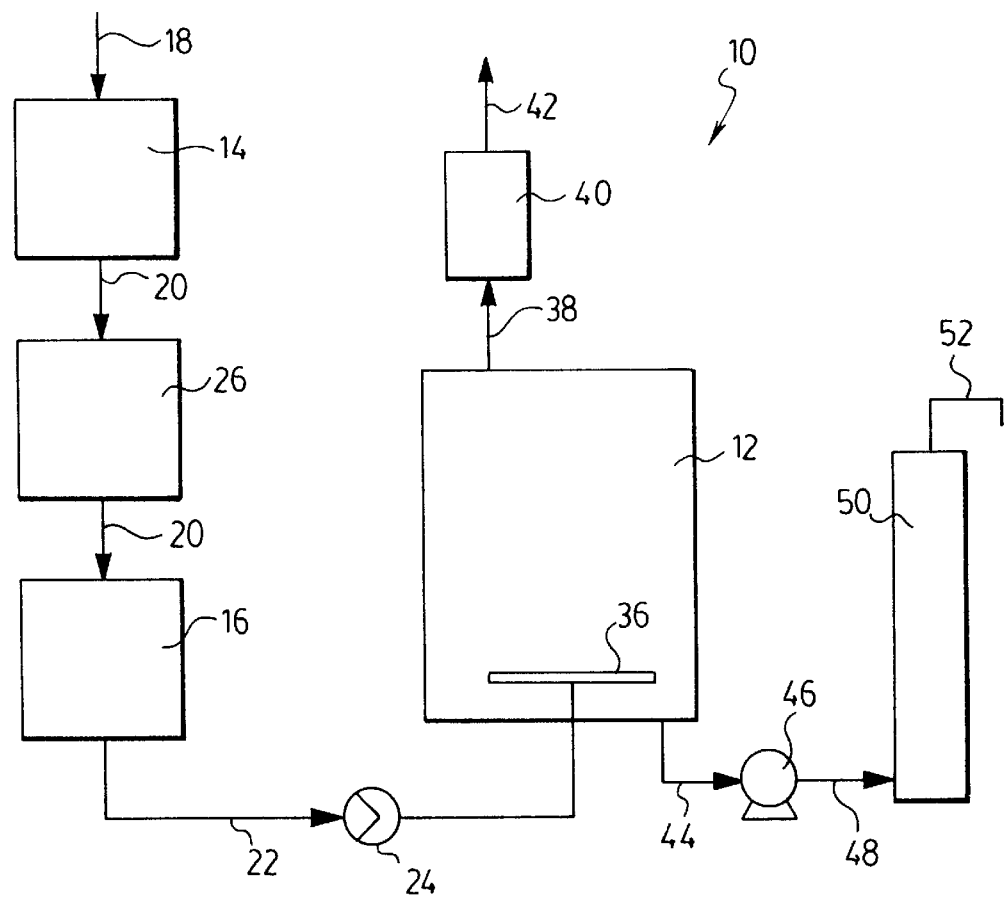
FIG. 1 shows a schematic representation of the apparatus according to the instant invention.

As shown in FIG. 1, water treatment apparatus 10 comprises a water treatment vessel 12, an air pump 14 and an ozone generator 16. Air stream 18 is drawn into air pump 16 and fed via conduit 20 to ozone generator 16 which produces air containing ozone. The air containing ozone is fed via conduit 22 to water treatment vessel 12. A check valve 24 may be optionally provided to prevent water flowing backwardly through conduit 22 to ozone generator 16.

Optionally, an oxygen concentrator 26 may be provided in conduit 20 to increase the concentration of oxygen in the air fed to ozone generator 16 which will increase the concentration of ozone produced by ozone generator 16.

Figure 2:
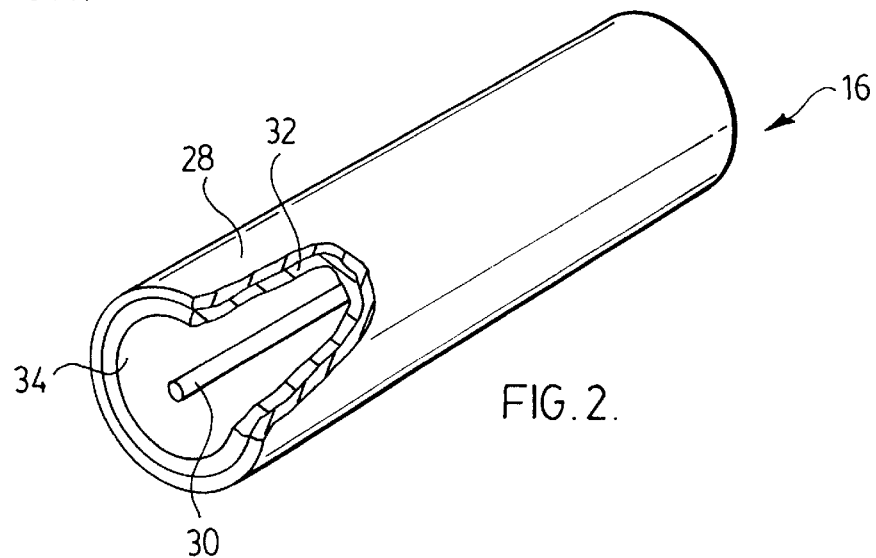
FIG. 2 shows a schematic representation of an ozone generator which may be used with the apparatus of FIG. 1; and, FIG. 3 shows an alternate schematic representation of an apparatus for the production of ozone which may be used with the apparatus of FIG. 1; and, FIG. 4 shows an alternate schematic representation of an apparatus for the production of ozone which may be used with the apparatus of FIG. 1; and, FIG. 5 shows an alternate schematic representation of an apparatus for the production of ozone which may be used with the apparatus of FIG. 1.

Ozone generator 16 is of the corona discharge type. In such generators, a high voltage electrode is spaced from a ground electrode with a dielectric member positioned there between. An air flow path is provided between the electrodes (eg. between the high voltage electrode and the dielectric member and/or between the dielectric member and the ground electrode). Ozone generator 16 may be of any particular configuration. For example, it may be a flat plate generator (i.e the electrodes may be flat) or it may be of the tubular type as shown in FIG. 2. As shown in FIG. 2, ozone generator 16 comprises a cylindrical outer ground electrode 28 and an inner high voltage electrode 30. Dielectric member 42 is positioned adjacent ground electrode 28 and spaced from high voltage electrode 30 to define an annular air flow path. Ozone generator may be electrically connected to any current source as is known in the art and may be connected in air flow communication with conduits 20 and 22 by any means known in the art.

In accordance with the instant invention, an oxygen bearing gas, preferably air, is continuously pumped through ozone generator 16. Pursuant to the instant invention, the ozone generator is intermittently operated (energized). When ozone generator 16 is energized, ozone is provided for treating water. When ozone generator 16 is de-energized, then air is provided to cool ozone generator 16. Ozone generator is preferably de-energized for a sufficient period of time to prevent excessive ozone degradation. During a single water treatment cycle, (e.g. in a batch process, a treatment cycle is the time required to treat the batch of water or in a continuous process when water is to be treated), ozone generator is preferably de-energized periodically. The length of each period during which the ozone generator is de-energized will vary depending upon several factors. If ozone generator 16 has a heat exchanger or heat sink to cool the ozone generator, then the de-energized periods may be reduced. Further, the more frequent the de-energized periods, then the shorter the duration of each de-energized period. Preferably, the duty cycle (the period when ozone generator is energized) is from 50 to 95, preferably from 75 to 90 and, most preferably, from 80% to 90% of a water treatment cycle.

The following example exemplifies the advantages of periodically operating ozone generator 16. During each 30 seconds of water treatment, ozone generator 16 may be operated for 24 seconds and then de-energized for 6 seconds (an 80% duty cycle). When operated continuously (100% duty cycle), ozone generator produces 0.100 wt. % ozone at steady state conditions. However, when operated at with this 80% duty cycle, the same ozone generator has produces 0.180 wt. % ozone at steady state conditions. Due to the higher mean concentration of ozone which is produced, the total amount of ozone is in fact higher (144% in this example) even though ozone generator is energized for only 80% of the time. Thus the absolute output and concentration and efficiency of the generator are all improved.

Preferably, different flow rate of air may be supplied to ozone generator 16. More preferably, higher flow rates will be supplied when the ozone generator is de-energized. For example, air pump 14 may provide first and second flow rates of air to conduit 20. In a counter top domestic application designed to treat two liters of water at a time, the higher flow rate (when the ozone generator is de-energized) may be 4–6 liters/minute and the lower air flow rate (when the ozone generator is energized) may be 1–2 liters/minute. Preferably, the higher flow rate is reduced by 50–85% to obtain the lower flow rate. This results is an increase of 25% or more in the concentration of ozone in the air exiting ozone generator 16 while reducing the total amount of ozone produced per unit time by about 50%.

It will also be appreciated that instead of using a two speed air pump, two air pumps may be used and each air pump may deliver air to different ozone generators. Thus water treatment vessel 12 may initially receive ozone containing air from a first air pump and ozone generator and then subsequently receive ozone containing air from a second air pump and ozone generator. A valve (eg. a solenoid valve or check valve) may be used to selectively connect water treatment vessel 12 in air flow communication with the air pump that is operational.

As shown in FIG. 1, water treatment vessel 12 is a batch treatment reactor. Thus, water is introduced into water treatment vessel 12 and is then treated with ozone containing gas sporadically. When air is pumped through energized ozone generator 16 air having ozone is produced which is then fed to water treatment vessel 12 via conduit 22. Subsequently, e.g., just prior to when there would be a marked drop off in the concentration of ozone which is produced, ozone generator 16 is de-energized such that a relatively low flow rate of relatively higher concentration ozone (the second concentration)ozone generator is cooled by the air passing there through. Although no ozone is provided to water treatment vessel 12 during the de-energized periods, ozone generator is maintained at a cooler mean temperature thereby resulting in a higher concentration of ozone being produced. Advantageously, higher concentrations are efficacious to treat certain chemical and micro-biological contaminants in the water.

Water treatment vessel 12 may be of any particular design known in the art and water and the air containing ozone may be introduced into water treatment vessel 12 by any method known in the art. For example, water treatment vessel 12 may have an inlet port for the water to be treated and a separate inlet port in fluid communication with sparger 36 for the air containing ozone. Sparger 36 may be any means known in the art to introduce the ozone containing air to the water in water treatment vessel 12 as bubbles. Alternately, the water and the air containing ozone may be introduced through the same inlet port. While some of the air containing ozone may be introduced into water treatment vessel 12 when at least some of the liquid is in water treatment vessel 12, it is preferred that all of the air containing ozone is introduced into water treatment vessel 12 once a full charge of water to be treated has been introduced into water treatment vessel 12. It will be appreciated that water treatment vessel 12 may be a continuous feed reactor.

It will also be appreciated that the water to be treated may be filtered (eg. by passing the water through a carbon filter) prior to treating the water with ozone.

The off gas may be permitted to exit water treatment vessel 12 via conduit 38 during the treatment cycle. The off gas generally contains some ozone and is therefore preferably fed to ozone destructor 40 wherein the ozone is converted to oxygen such as by contacting the ozone with, eg., one or more of manganese dioxide, titanium dioxide, iron oxide, or carbon or any other material known in the art top convert ozone to oxygen. The treated off gas may then be released from apparatus 10 via conduit 42. Optionally, some or all of the off gas may be retained in water treatment vessel 12 during the treatment cycle to pressurize water treatment vessel 12. In such an embodiment, the off gas outlet port may be partially or fully sealed during part or all of the treatment cycle.

Water treatment apparatus 10 may be actuated by any other means known in the art. For example, the unit may be actuated when a lid for water treatment vessel 12 is sealed or, if the water is supplied via a hose, when a sensor (eg. a float switch) detects a full charge in water treatment vessel 12 or when a start button is pushed.

Once the water in water treatment vessel 12 is sufficiently treated, a lid for water treatment vessel 12 may be removed, and the water may be removed for use (eg. it may be poured out of water treatment vessel 12, preferably through a filter). It will of course be appreciated that an outlet for the water may be in any suitable form. For example, referring to FIG. 1, the outlet may be connected to conduit 44 which is in fluid flow communication with water pump 46 which in turn is fluid flow communication with carbon block filter 50 via conduit 48. Filter 50 may be in fluid flow communication with dispenser 52.

Optionally a sensor (not shown) may be provided for monitoring the treatment of the water and providing a signal to a user when the treatment is complete. The sensor may send a signal indicating that the treatment was successfully completed or that the treatment was not successfully completed. The sensor may be any of those known in the art.

Figure 3:
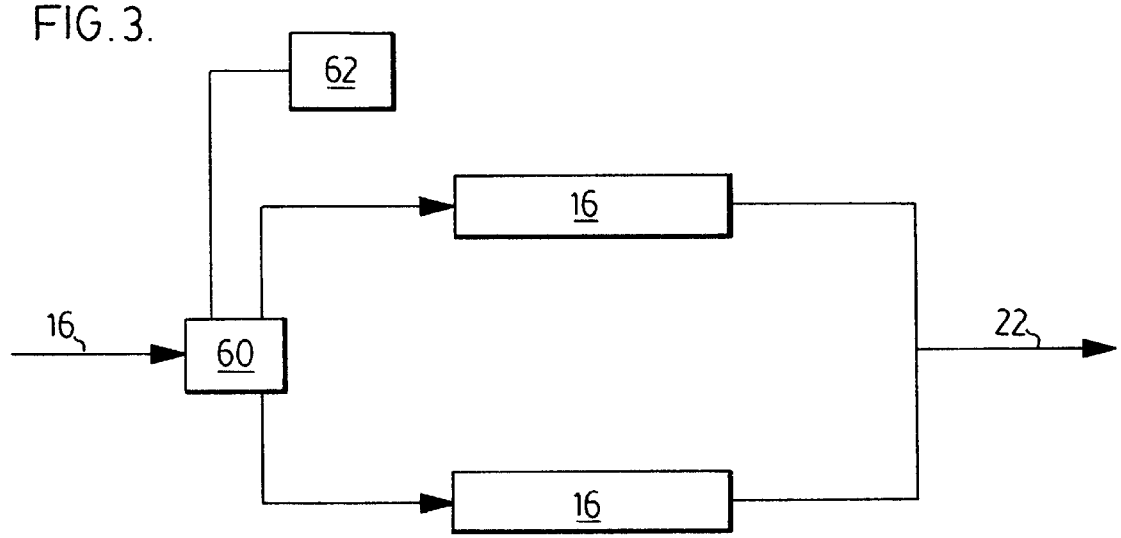

It will be appreciated by those skilled in the art that various modifications may be made within the spirit of the present invention, the scope of which is limited only by the claims. For example, a plurality of ozone generators may be provided so that one or more ozone generators may produce ozone while one or more other ozone generators are being cooled. Referring to FIG. 3, two ozone generators 16 may be provided. In operation, if the air flow passages are of a similar dimension, then 50% of the air would be directed to each ozone generator 16. A valve 60 may optionally be provided to direct a higher proportion of the flow of air to one ozone generator 16 while it is energized and to then direct a higher proportion of the air at the other ozone generator 16 while it is energized. Valve 60 is preferably a solenoid valve which is switched by controller 62 which positions valve 60 so as to direct more of the air flow to the energized ozone generator.

Figure 4:
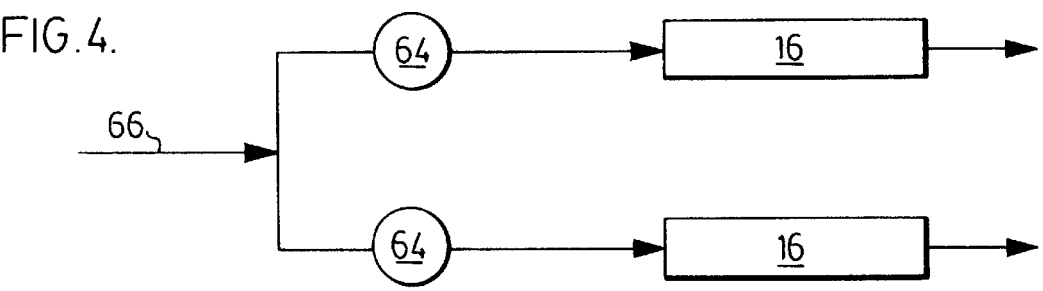

In the embodiment of FIG. 4, two ozone generators 16 are provided. A variable aperture 64 is provided upstream from each ozone generator 16. An oxygen bearing gas source 66 is provided upstream of apertures 64. Apertures 64 are operable to reduce the flow rate of gas passing through the ozone generator 16 to which it is connected. Preferably, aperture 64 reduces the flow rate of gas passing through ozone generator 16 to the flow rate which results in ozone generator 16 producing the desired amount or the desired concentration of ozone. Oxygen bearing gas source 66 provides a flow rate of gas in excess of this desired amount. Accordingly, aperture 64 (which may be a variable openable iris) is adjusted to reduce the flow rate of gas to ozone generator 16. As discussed previously, a higher flow rate of gas is preferably provided to cool an ozone generator when it is de-energized. Thus, when one ozone generator 16 is de-energized, the respective aperture 64 is preferably opened to allow a higher flow rate of gas to cool that ozone generator and, when the other ozone generator 16 is energized, the respective aperture 64 is preferably closed down to allow a lower flow rate of gas to that ozone generator which is now producing ozone. For example, if oxygen bearing gas source 66 provides a flow rate of 20 l/min, aperture 64 preferably reduces the flow rate to the energized ozone generator 16 to, e.g., 4 l/min while the other aperture 64 is open to permit the de-energized ozone generator 16 to receive a higher flow rate, e.g., 16 l/min whereby it is cooled. It will be appreciated that there may be periods of time when both ozone generators are energized and are both producing ozone. It will also be appreciated that ozone generators 16 may be plumbed so that when they are de-energized their output is vented from the system. In this way, water treatment chamber 12 receives a more constant flow rate of ozone containing gas.

Figure 5:
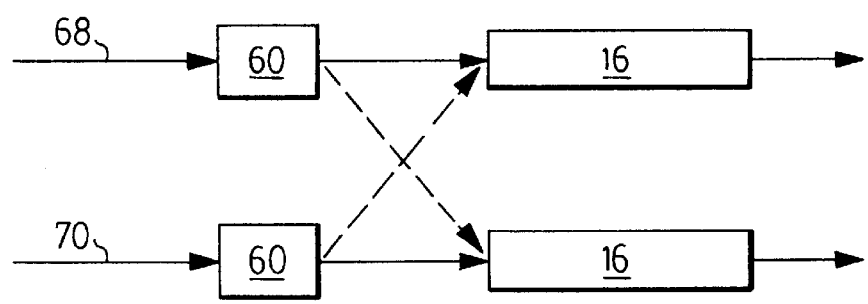

It will be appreciated that two oxygen bearing gas sources may alternately be provided, each of which provides a different flow rate of gas (see FIG. 5). In this embodiment, the ozone generators are selectively connectable in fluid flow communication with each air flow source so that the ozone generator which is energized is connected with the gas flow source 68 having the lower flow rate (solid line in FIG. 5) and the de-energized ozone generator is connected to the gas flow source 70 having the higher flow rate (solid line in FIG. 5). When the energized ozone generator requires cooling, the connections may be reversed so that the ozone generator which requires cooling is now connected to gas flow source 70 having the higher gas flow rate (shown in dotted line in FIG. 5) and the cooled ozone generator (the one which had been connected to the gas source having the higher gas flow rate) is now energized so as to produce ozone and is connected to the gas flow source 68 having the lower flow rate (shown in dotted line in FIG. 5).

I claim:

1. A method for treating a liquid with a gas containing oxygen comprising the steps of:
    (a) passing the gas through an corona discharge ozone generator to produce gas containing ozone and introducing the gas containing ozone into the liquid; and,
    (b) periodically de-energizing the ozone generator and passing gas through the ozone generator while the ozone generator is de-energized.

2. The method as claimed in claim 1 wherein the gas which passes through the ozone generator when it is de-energized is introduced into the liquid.

3. The method as claimed in claim 1 wherein the flow rate of gas through the ozone generator is varied when the ozone generator is de-energized.

4. The method as claimed in claim 1 wherein the flow rate of gas through the ozone generator is decreased when the ozone generator is energized.

5. The method as claimed in claim 4 wherein the flow rate of gas through the ozone generator when the ozone generator is energized is about 50 to 85% lower than when the ozone generator is de-energized.

6. The method as claimed in claim 1 further comprising providing a substantially constant current to the ozone generator.

7. The method as claimed in claim 1 wherein the ozone generator is energized for 50 to 95% of period of time during which the liquid is being treated.

8. The method as claimed in claim 1 wherein at least two ozone generators are provided and the method further comprises selectively energizing one or more ozone generator and flowing the gas to the ozone generators whereby, periodically, at least one ozone generator is de-energized and is cooled by the gas flow.

9. The method as claimed in claim 8 further comprising directing a higher proportion of the gas to the one or more ozone generator which is de-energized.

10. The method as claimed in claim 8 further comprising providing first and second gas flow sources wherein the first gas flow source has a lower flow rate than the second gas flow source and directing the first gas flow source to the one or more ozone generator which is energized.

11. The method as claimed in claim 8 further comprising providing a single gas flow source at a first flow rate and reducing the flow rate of gas from the single gas flow source to the one or more ozone generator which is energized.

12. The method as claimed in claim 1 wherein the liquid is water and the method further comprises introducing the water to be treated into a treatment vessel prior to introducing the gas into the liquid whereby potable water is produced by contacting the water with the gas.

13. A method for cooling a corona discharge ozone generator comprises:
    (a) passing a gas containing oxygen through the corona discharge ozone generator and energizing the ozone generator to produce gas containing ozone; and,
    (b) periodically de-energizing the ozone generator and passing gas through the ozone generator whereby the ozone generator is cooled.

14. The method as claimed in claim 13 wherein the flow rate of gas through the ozone generator is varied when the ozone generator is de-energized.

15. The method as claimed in claim 13 wherein the flow rate of gas through the ozone generator is decreased when the ozone generator is energized.

16. The method as claimed in claim 15 wherein the flow rate of gas through the ozone generator when the ozone generator is energized is about 50 to 85% lower than when the ozone generator is de-energized.

17. The method as claimed in claim 13 further comprising providing a substantially constant current to the ozone generator.

18. The method as claimed in claim 13 wherein the ozone generator is energized for 50 to 95% of period of time during which the liquid is being treated.

* * * * *